UNITED STATES PATENT OFFICE.

JAMES HENDERSON, OF BELLEFONTE, PENNSYLVANIA.

MANUFACTURE OF IRON AND STEEL.

SPECIFICATION forming part of Letters Patent No. 274,889, dated March 27, 1883.

Application filed September 27, 1882. (No specimens.) Patented in England November 8, 1870, No. 2,940.

*To all whom it may concern:*

Be it known that I, JAMES HENDERSON, of Bellefonte, in the county of Centre and State of Pennsylvania, have invented a new and useful Improvement in the Manufacture of Iron and Steel; and I do hereby declare that the following is a full, clear, and exact description of the same.

The invention relates to the refining of crude iron for foundry purposes, and for the production of wrought-iron and of steel by the removal therefrom of the phosphorus almost always found associated with crude iron. This substance, as is well known, renders iron and steel brittle, and therefore, when present to any appreciable degree, seriously impairs their quality. The mode which I have invented for freeing crude iron from this deleterious substance is as follows: The melted iron is charged into a furnace, converter, or other vessel having a basic lining, and is subjected in such furnace or vessel to the action of a calcareous agent and of a blast or jets of air or of air mingled with oxygen. I prefer to employ the kind of converter used in the so-called "Bessemer process," in which the blast is applied at the bottom or the sides of the vessel, so as to act from the bottom or lower part of the metal upward; but I do not confine myself to the use of such a converter, as the invention may be practiced with an open-hearth furnace when air is blown beneath the surface of the metal. The ordinary silicious lining of the converter or furnace is to be covered with a supplemental lining formed from some basic material adapted to such use; and for this purpose the basic oxides enumerated in English Patent No. 1,051, of April 9, 1870—viz., lime, magnesia, magnesian lime—may be employed, the object in using a lining of this character being to protect the molten metal from contact with silica during the time when the calcareous agent employed is absorbing the phosphorus. If the metal were to be charged directly upon silicious lining, the silica of the lining would interfere with the proper action of the purifying agent.

In using an oxide lining of the character above indicated, the material selected may be applied in the form of a paste, or it may be rammed in behind a form; or, if capable of being made into a brick, (as is the case with magnesia when treated by the Carron process, as set forth in "Dingler's Polytechnic Journal" of 1868, volume 189, pages 110 and 111,) the supplemental lining may be made of such brick.

The calcareous purifying agent which I prefer to use is fluor-spar; and the preferable mode of using it is to apply it in the form of a coating to the supplemental oxide lining above spoken of. Another mode of using it is to introduce it into the furnace or converter in a finely-divided state, which may be effected by blowing it in with the jets of air; or it may be introduced into the vessel or furnace before the charge of metal, in which case preferably it should be subjected to a heat sufficient to render it viscid before the metal is charged upon it. The action of the molten metal upon the fluor-spar is to melt it and decompose it, the fluorine combining with the silica or silicon of the metal and removing the same, or the greater part thereof, in the form of a vapor or gas. The metallic base of the fluor-spar, which consists of calcium, becomes oxidized into lime, and this lime combines with the phosphorus and forms slag. It will thus be apparent that, so far as the fluor-spar is efficient in removing the phosphorus, it is by virtue of its calcareous or basic character, and that the advantage in using fluor-spar in preference to other calcareous agents is that it will also aid in removing the silica or silicon, as above described. It follows that, if other agents be used for the removal of the silica, other calcareous substances—such as lime—may be used instead of fluor-spar for the removal of the phosphorus.

The purified metal produced by the above process may be used either to form castings or to form steel; or all the carbon may be removed, so as to make the product wrought-iron. The character of the product will be determined by the amount of oxygen introduced into the converter, and also by the amount of carbon contained in the iron, and it will of course vary according to the proportion of the carbon which the operator wishes to remove.

It is not claimed that there is any novelty in lining a furnace or converter with a basic lining. Such a lining is suggested by Leon Talabot, in a French patent as early as 1857, as one but not his preferred mode of preparing a Bessemer converter for the practice of his special process. So, also, in the English patent of Du Motay, No. 1,833 of 1868, the walls of the purifying-vessel are constructed of magnesia or alumina; but in neither of the processes described in these patents is a calcareous reagent used to remove phosphorus. The process of dephosphorization which constitutes the present invention is essentially different from anything there described. It is now proposed to remove the phosphorus by the active agency of a calcareous substance, and the basic lining, as hereinbefore indicated, becomes important as a means of protecting the metal from contact with the silicious material usually employed to line converters and furnaces.

What I claim as my invention, and desire to secure by Letters Patent, is—

The herein-described mode of dephosphorizing crude iron in the manufacture of iron and steel, which consists in introducing the molten metal into a furnace, converter, or other vessel provided with a basic lining, and treating it therein by a calcareous substance with jets or blasts of air.

JAMES HENDERSON.

Witnesses:
SAML. A. DUNCAN,
G. A. C. BARNETT.